Figure 1:
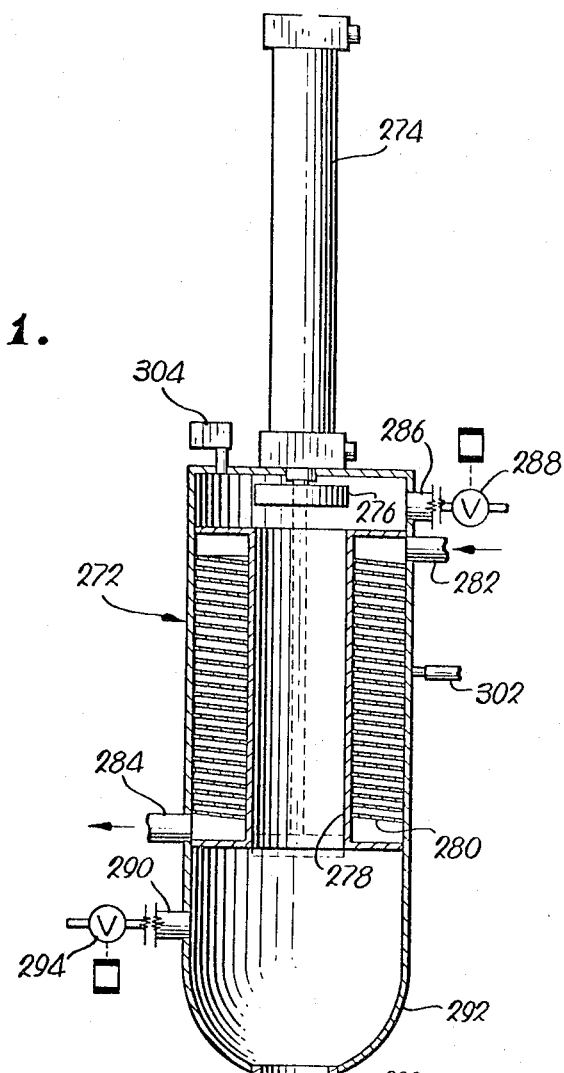

United States Patent [19]
King

[11] 3,788,473
[45] Jan. 29, 1974

[54] PARTICLE SEPARATOR

[76] Inventor: Arthur S. King, 1710 Baltimore, Kansas City, Mo. 64105

[22] Filed: Jan. 15, 1973

[21] Appl. No.: 323,750

Related U.S. Application Data

[60] Division of Ser. No. 100,221, Dec. 21, 1970, Pat. No. 3,718,256, which is a division of Ser. No. 727,835, May 9, 1968, Pat. No. 3,585,122, which is a continuation-in-part of Ser. No. 613,616, Feb. 2, 1967, abandoned.

[52] U.S. Cl.................. 210/112, 210/179, 210/243
[51] Int. Cl............................................. B01d 43/00
[58] Field of Search................. 210/71–73, 175, 210/176, 179, 243

[56] References Cited
UNITED STATES PATENTS

| | | | |
|---|---|---|---|
| 2,731,456 | 1/1956 | Weedman | 210/71 X |
| 2,827,173 | 3/1958 | Jones | 210/72 |
| 2,855,100 | 10/1958 | Findlay | 210/71 X |
| 3,186,551 | 6/1965 | Dornauf | 210/243 |
| 2,478,934 | 8/1949 | Morse | 210/243 X |
| 2,534,907 | 12/1950 | Ham et al. | 210/243 X |

*Primary Examiner*—John Adee
*Attorney, Agent, or Firm*—Gordon D. Schmidt et al.

[57] ABSTRACT

Particles are removed from fluids, such as water, previously subjected to electrostatic fields. When subjected to an initial electrostatic treatment, the fluid undergoes a reduction in surface tension and neutralization of charged, dissolved particles therein. Subsequent field treatments effect nucleation or coagulation of dissolved impurities and break molecule clusters to aid the nucleation or coagulation action. Suspended and nucleated or coagulated matter is removed from the fluid after the electric field treatments by discharging the fluid against an electrically conductive surface at ground potential maintained at a temperature different from that of the fluid. This causes the suspended and nucleated or coagulated matter to be deposited from the fluid and thus readily permits separation and removal.

2 Claims, 2 Drawing Figures

PATENTED JAN 29 1974 3,788,473

PARTICLE SEPARATOR

CROSS REFERENCES

This is a division of Ser. No. 100,221, Dec. 21, 1970, U.S. Pat. No. 3,718,256 which was a division of Ser. No. 727,835, May 9, 1968, U.S. Pat. No. 3,585,122, which is a continuation-in-part of Ser. No. 613,616, Feb. 2, 1967, abandoned.

An important object of the instant invention is to provide for particle separation wherein electric fields are initially used to act on water in a manner to obtain a polarizing action within the water solution to free undesired impurity ions from water molecule clusters to permit formation of ionic cyrstals by nucleation or coagulation.

It is another important object of the present invention to provide for separation from the fluid of the aforementioned undesired impurities therein by discharging the fluid against an electrically conductive surface maintained at a temperature different from that of the fluid.

Figure 2:
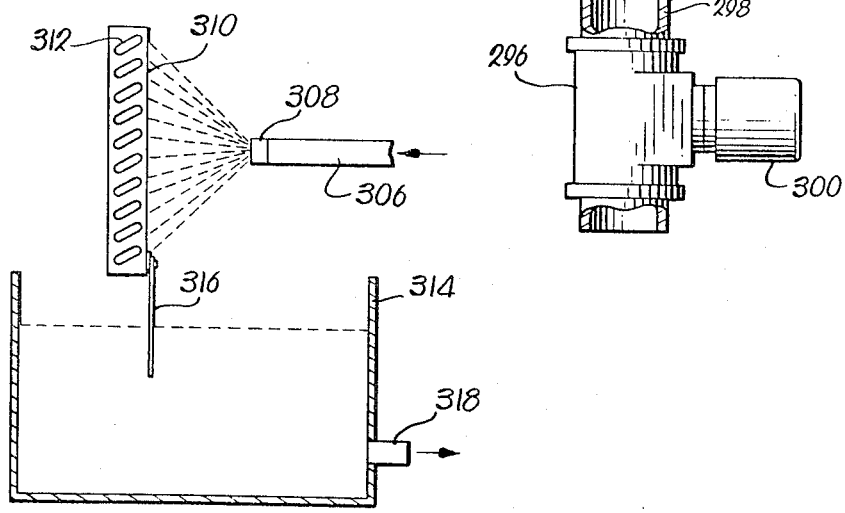

In the drawing:

FIG. 1 is a vertical cross-sectional view of one form of particle separator made pursuant to the present invention; and FIG. 2 is a diagrammatic illustration of a second form of particle separator.

In FIG. 1 the particle separator as shown comprises an upright, tubular, metallic housing 272 upon which a double-acting, pneumatic or hydraulic piston and cylinder assembly 274 is mounted. The piston rod within assembly 274 is axially aligned with the axis of housing 272 and is provided with a disc-shaped ram 276 at its lower end.

The housing 272 contains a cylindrical, metallic inner wall member 278 spaced from the outer wall of housing 272, a continuous, finned tube 280 of spiral configuration being disposed in the space between the two walls and communicating with an inlet 282 and an outlet 284. A heating or cooling medium is pumped or flows by gravity into inlet 282 for flow downwardly through the spiral tube 280 to the outlet 284. The inner wall member 278 is thus either heated or cooled by the action of the medium flowing in the tube 280.

A second inlet 286 communicates with the upper end of housing 272 above the inner wall member 278, flow of the previously treated fluid into housing 272 through inlet 286 being controlled by a solenoid valve 288. A second outlet 290 communicates with a catch basin 292 formed by the lower portion of housing 272, and is controlled by a solenoid valve 294. A drain valve 296 communicates with a drain pipe 298 leading from catch basin 292 and is operated by a solenoid 300. A ground connection is made to the housing 272 as illustrated at 302. A pressure switch 304 is sensitive to the pressure of fluid above the cylindrical inner wall 278 for the purpose of activating the piston and cylinder assembly 274 when the pressure reaches a predetermined level.

A second form of particle separator is illustrated diagrammatically in FIG. 2. A pipe 306 for receiving the previously treated fluid is provided with a nozzle or head 308 which discharges the fluid, such as water, against the electrically conductive surface of a metallic plate member 310 maintained at a temperature either higher or lower than the water by heat exchange tubing 312 which circulates a heating or cooling medium provided by a suitable source (not shown). The surface of plate 310 upon which the water is discharged is disposed in a vertical plane, the water thus draining therefrom into a catch basin 314 illustrated in the form of a hot well commonly used in conjunction with cooling towers. The plate 310 is maintained at ground potential by a conductor 316 depending from plate 310 into the water within well 314, the latter being maintained at ground potential either by virtue of construction within an excavation or suitable grounding connections. An outlet 318 for well 314 is disposed above the bottom of the well and, in cooling tower applications, would normally be in communication with the suction side of the recirculating pump for the heat exchanger.

OPERATION

In my copending application above identified there is disclosed an electrostatic field between a pair of electrodes of a primary treater into which water is directed through an inlet conduit. In flowing through the treater the water is subjected to the electrostatic field existing between the electrodes. Such treatment neutralizes dissolved impurity ions with respect to the metallic surfaces of pipes, etc. with which the water is ultimately brought into contact during use. This prevents plating-out of dissolved minerals in the water onto such surfaces to preclude the formation of scale and minimize corrosion problems.

Normally, the dipole water molecules cluster about the individual ions of dissolved impurities. In the treatment effected by a secondary treater disclosed in said application, a polarizing action within the water solution is obtained by virtue of the fact that both electrodes are prevented from establishing electrical contact with the solution. The polarizing action causes alignment of dipole water molecules and the ions of dissolved impurites. The ions are thus freed from the water molecule clusters, permitting oppositely charged ions to form an array held by mutual attraction, which array forms an ionic crystal and is, therefore, no longer a dissolved impurity but a particle given birth by nucleation or coagulation that may be removed.

The water containing suspended and nucleated or coagulated matter is directed into the inlet 286 or the particle separator of FIG. 1, whereupon such water flows downwardly over the electrically conductive inner surface of the metallic wall member 278 and into the catch basin 292 for ultimate flow therefrom through outlet 290. The temperature of the wall member 278 is maintained a few degrees (10°–15° F., for example) above or below the temperature of the incoming water, and the wall member 278 is maintained at ground potential. It has been found that the matter in the water, due to an enhancement of nucleation or coagulation, is deposited in the catch basin 292 and upon the inner surface of the wall member 278. This is a result of discharging the water, with attendant pressure drop, against an electrically conductive surface at ground potential maintained at a temperature a few degrees different from that of the water.

The pressure switch 304 may be utilized in conjunction with suitable control circuitry (not shown) to activate the piston and cylinder assembly 274 when the pressure in the chamber above the wall member 278 reaches a predetermined level. Such pressure buildup is caused by the gradual accumulation of deposited particles on the inner surface of wall member 278. Activation of assembly 274 extends the ram 276 to the broken line position thereof illustrated and swabs the deposit from the internal surface of wall member 278, whereupon such deposit falls into the catch basin 292. Ultimately, when the accumulation of the deposit in catch basin 292 becomes excessive, the separator is cleaned by first closing valves 288 and 294 and then opening the drain valve 296, followed by activation of assembly 274 to drive the deposit from the catch basin 292. Sufficient water is trapped within housing 272 for the cleaning action. Thereafter, the inlet valve 288 is opened to flush the housing 272; normal operation is resumed by reopening the outlet valve 294 and reclosing the drain valve 296.

In the use of the second form of particle separator illustrated in FIG. 2, the particles collect at the bottom of the hot well 314. For this reason, the outlet 318 is elevated above the bottom of the well 314. It is normally not required that the surface of plate 310 be cleaned since the particles gravitate from the surface of plate 310 into the well 314. In principle, the operation of the particle separator of FIG. 2 is the same as discussed above with respect to the separator of FIG. 1 in that the water is discharged against an electrically conductive surface at ground potential maintained at a temperature a few degrees warmer or cooler than the temperature of the water.

Having thus described the invention, what is claimed as new and desired to be secured by Letters Patent is:

1. A separator for removing electrically neutral, nucleated particles dispersed in a fluid, said separator comprising:
   an elongated housing having an inlet for the particle-laden fluid adjacent one end thereof and an outlet for the separated fluid adjacent the opposite end thereof;
   an electrically conductive tube supported within said housing in laterally spaced relation thereto and extending longitudinally thereof,
   said tube having one terminus thereof located adjacent said inlet for receiving particle-laden fluid as it enters the housing, and having the opposite terminus adjacent said outlet for discharging separated fluid from the housing through the outlet,
   said housing having an inlet chamber between said one terminus of the tube and said inlet in flow communication with the latter and said one terminus;
   heat exchange apparatus encircling said tube within the space between the latter and the housing for maintaining the tube at a temperature different from the temperature of the particle-laden fluid;
   means electrically connected with the tube for maintaining the same at ground potential; and
   a reciprocable piston having a scraping head movable axially within said tube for periodically removing from the latter particles that have left the fluid and become attached to the tube interiorly of the latter,
   said head being reciprocable between a retracted position within said chamber spaced from said one terminus of the tube to open the same for fluid flow and an extended position at least to said opposite terminus for clearing the tube completely of collected particles between said termini,
   said housing having a catch basin normally below said opposite terminus and the outlet for receiving particles scraped from the tube by said piston,
   said inlet and said outlet each being provided with a valve for selectively closing the same,
   said basin having an openable discharge drain for exhausting particle residue from the basin when said valves are closed and said piston head is forced toward its extended position.

2. A separator as claimed in claim 1, wherein is provided a pressure-sensitive device associated with said chamber for actuation of the piston in response to a predetermined pressure build-up in said tube as a result of particles collected thereon.

* * * * *